(12) United States Patent
Matthews

(10) Patent No.: US 8,484,271 B1
(45) Date of Patent: Jul. 9, 2013

(54) RECURSIVE BESSEL FILTER FOR STRAY LIGHT CORRECTIONS IN AN IMAGER

(75) Inventor: Grant Matthews, Ft. Wayne, IN (US)

(73) Assignee: Exelis, Inc, McLean, VA (US)

( * ) Notice: Subject to any disclaimer, the term of this patent is extended or adjusted under 35 U.S.C. 154(b) by 484 days.

(21) Appl. No.: 12/823,264

(22) Filed: Jun. 25, 2010

(51) Int. Cl.
*G06F 17/10* (2006.01)

(52) U.S. Cl.
USPC ........................................... 708/300

(58) Field of Classification Search
None
See application file for complete search history.

(56) References Cited

U.S. PATENT DOCUMENTS

| | | | |
|---|---|---|---|
| 4,109,278 A | 8/1978 | Mendrala et al. | |
| 5,218,416 A | 6/1993 | Haring et al. | |
| 6,111,640 A | 8/2000 | Hedman et al. | |
| 6,556,289 B1 | 4/2003 | Granger | |
| 6,853,387 B2 * | 2/2005 | Evanicky et al. | 345/690 |
| 7,068,263 B2 * | 6/2006 | Evanicky et al. | 345/207 |
| 8,181,511 B2 * | 5/2012 | Meier et al. | 73/170.16 |
| 2006/0071078 A1 * | 4/2006 | Olmstead | 235/462.01 |
| 2006/0232576 A1 * | 10/2006 | Evanicky et al. | 345/207 |

* cited by examiner

*Primary Examiner* — David H Malzahn
(74) *Attorney, Agent, or Firm* — RatnerPretia

(57) ABSTRACT

A system for correcting infrared (IR) radiances includes an imager for receiving IR radiances and outputting intensity data corresponding to pixels in the imager. Also included is a stray light estimator for receiving the intensity data and estimating stray light in the intensity data. The stray light estimator includes a Bessel filter for low pass filtering the estimated stray light and providing corrected intensity data as an output to a user. The Bessel filter is an n-pole recursive digital filter, which is expressed as a ratio between (a) an (n−1) order polynomial of a complex number and (b) an n order polynomial of a complex number, where n is a positive integer. The Bessel filter includes an infinite response curve, in which the response curve monotonically decreases in amplitude as a function of frequency per pixels.

19 Claims, 10 Drawing Sheets

RECURSIVE BESSEL FILTER FOR STRAY LIGHT CORRECTIONS IN AN IMAGER

FIELD OF THE INVENTION

The present invention relates to the field of image corrections. More specifically, the present invention relates to methods and systems for filtering of stray light in an image by using a recursive Bessel filter.

SUMMARY OF THE INVENTION

To meet this and other needs, and in view of its purposes, the present invention provides a system for correcting infrared (IR) radiances. The system includes an imager for receiving IR radiances and outputting intensity data corresponding to pixels in the imager, and a stray light estimator for receiving the intensity data and estimating stray light in the intensity data. The stray light estimator includes a Bessel filter for low pass filtering the estimated stray light and providing corrected intensity data as an output to a user.

The Bessel filter is an n-pole recursive digital filter, where n is a positive integer. The Bessel filter is comprised of a ratio between (a) an (n−1) order polynomial of a complex number and (b) an n order polynomial of a complex number, where n is a positive integer. The number n may be 8. The Bessel filter includes an infinite response curve, and the response curve monotonically decreases in amplitude as a function of frequency per pixels.

The stray light estimator includes an interpolator for receiving multiple bandwidths of the intensity data and interpolating the multiple bandwidths to obtain the estimated stray light in a first bandwidth. The Bessel filter is configured to receive the estimated stray light and provide the corrected intensity data in the first bandwidth, as the output to the user. The Bessel filter includes a subtraction module for subtracting the estimated stray light from the intensity data and outputting the corrected intensity data in the first bandwidth.

The imager may include an imager disposed in a satellite. The IR radiances may include radiances reflected from the Earth. The Bessel filter may be configured to low pass filter a portion of the IR radiances.

Another embodiment of the present invention is a filtering system. The filtering system includes a module for outputting pixel data, and a Bessel filter for low pass filtering the pixel data. The Bessel filter is an n-pole recursive digital filter, where n is a positive integer. The Bessel filter is comprised of a ratio between (a) an (n−1) order polynomial of a complex number and (b) an n order polynomial of a complex number, where n is a positive integer. The Bessel filter includes an infinite response curve, and the response curve monotonically decreases in amplitude as a function of frequency per pixels.

Yet another embodiment of the present invention is a method of filtering image data in the infrared (IR) region. The method includes the steps of:
receiving IR radiances and outputting intensity data;
estimating noisy stray light in the intensity data;
filtering the estimated noisy stray light to obtain smooth stray light;
subtracting the smooth stray light from the received IR radiances; and
outputting corrected IR radiances to a user.

Filtering includes using a Bessel filter to low pass filter the estimated noisy stray light. Using the Bessel filter includes forming an n-pole recursive digital filter, wherein n is an integer number. Using the Bessel filter also includes forming a ratio between (a) an (n−1) order polynomial of a complex number and (b) an n order polynomial of a complex number, where n is an integer number.

Receiving the IR radiances may include receiving multiple radiances having different bandwidths.

Estimating the noisy stray light may include interpolating the received multiple radiances to form the noisy stray light in a single bandwidth.

Filtering the estimated noisy stray light may include using a Bessel filter to low pass filter the noisy stray light in the single bandwidth to form the smooth stray light.

It is understood that the foregoing general description and the following detailed description are exemplary, but are not restrictive of the invention.

BRIEF DESCRIPTION OF THE DRAWINGS

The invention is best understood from the following detailed description when read in connection with the accompanying figures.

DETAILED DESCRIPTION OF THE INVENTION

Figure 1:
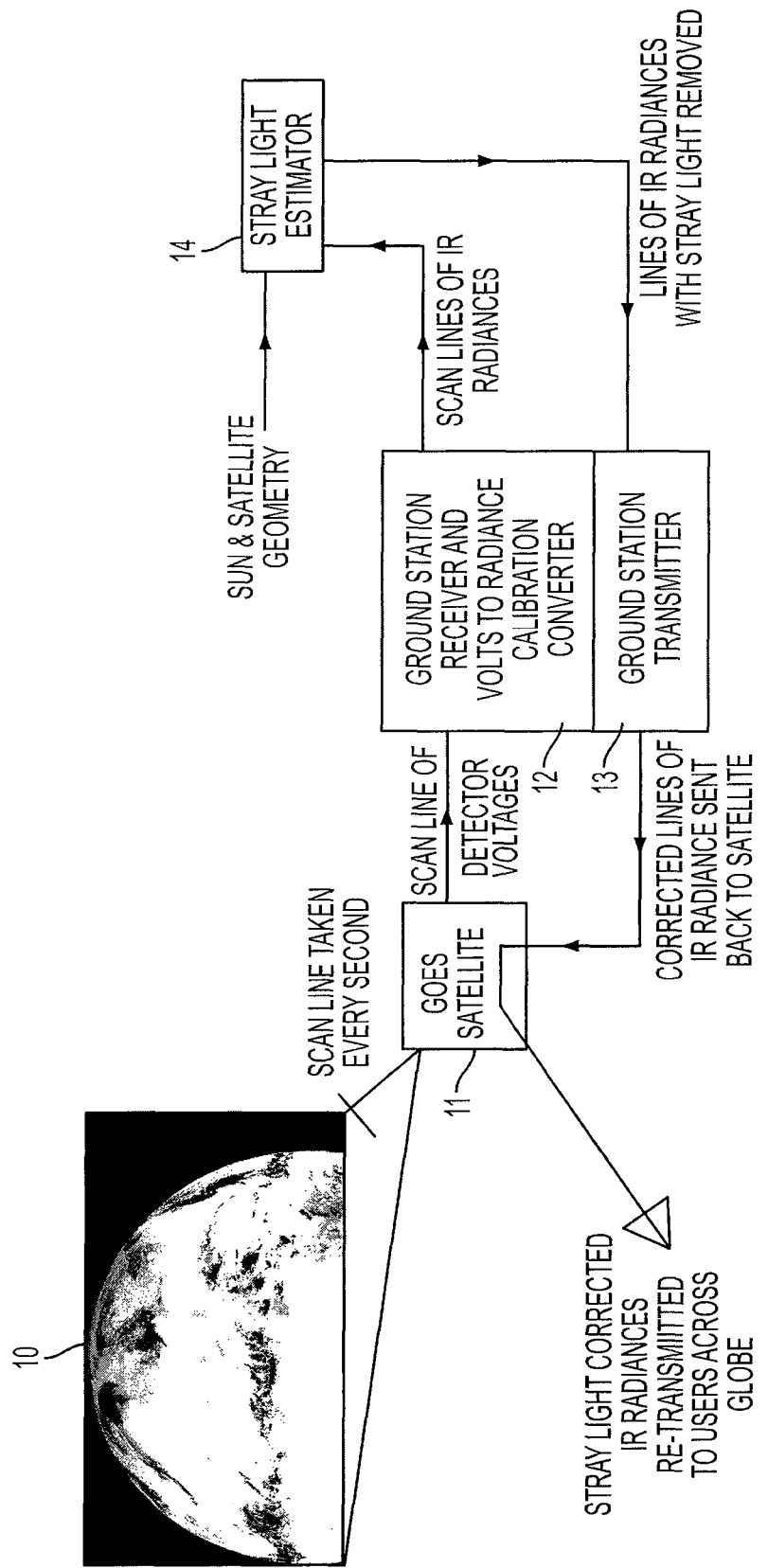
FIG. 1 is a block diagram of a system for correcting raw radiances received by imaging the earth, in accordance with an embodiment of the present invention.

A system for imaging the earth from a satellite is shown in FIG. 1. As shown, the system includes the Geostation Operational Environment Satellite (GOES), designated as 11, which obtains images of the earth. The images are scanned and transmitted to a ground station, which includes a receiver 12 and a transmitter 13. The images are scanned on a per line basis by the GOES satellite and transmitted to the ground station. The ground station converts the detected voltages of each scanned line of an image into radiance signals. Four different radiance signals are produced, one for 3.9 microns (um), one for 6.5 um, one for 10.7 um, and one for 13.3 um.

The scanned lines of the radiance signals are, in turn, sent to a stray light estimator, designated as 14. The stray light estimator reduces the stray light present in each scanned line, by taking into consideration the geometry of the sun and the GOES satellite with respect to the earth.

After the stray light has been reduced or minimized, the lines of radiances are sent back to the ground station transmitter 13. The transmitter 13, in turn, sends the corrected lines of radiances back to the GOES satellite for final transmission to users across the globe.

Figure 2A:
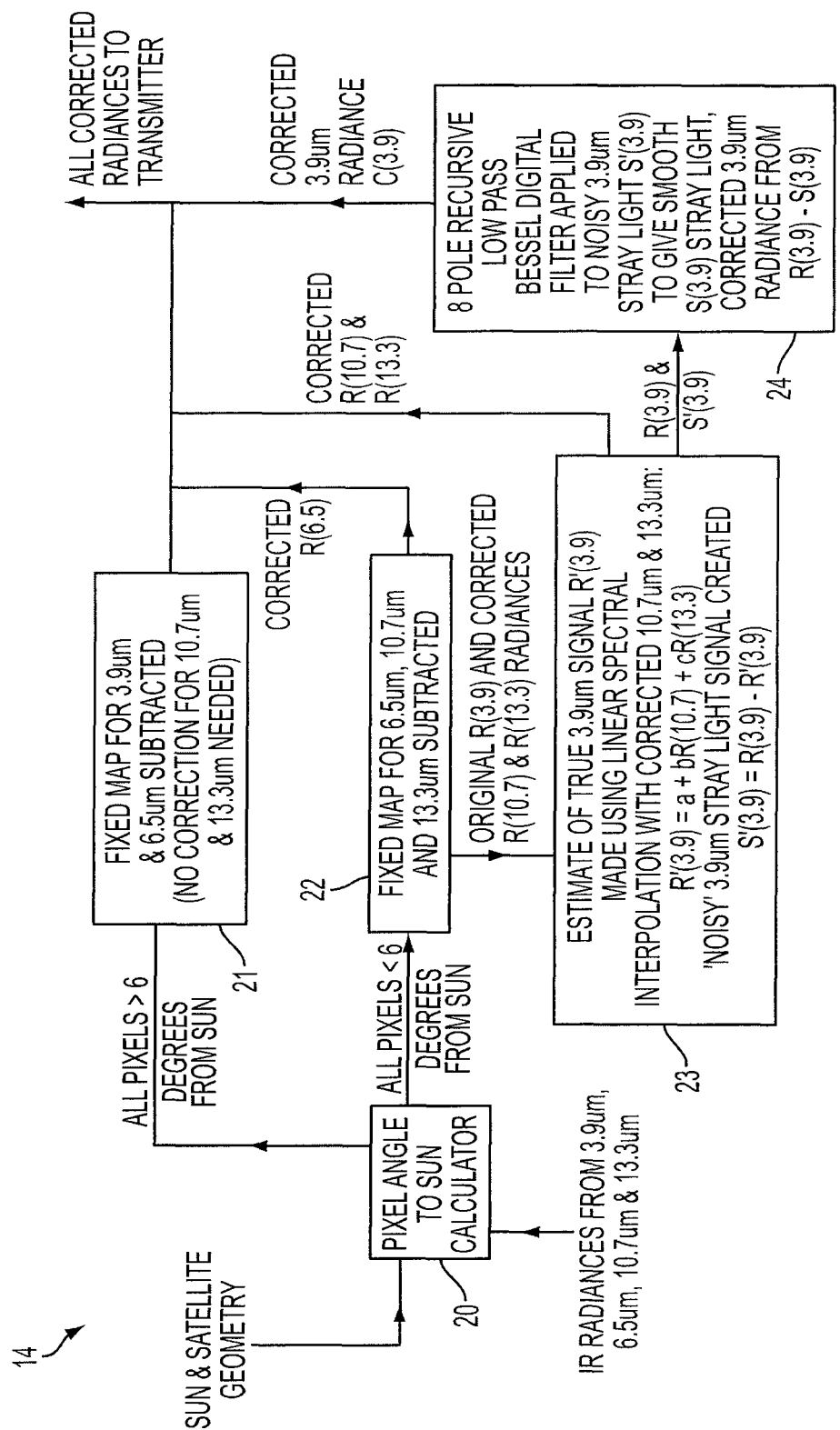
FIG. 2A is a block diagram showing additional details of a stray light estimator included in the system of FIG. 1, in accordance with an embodiment of the present invention.

Referring next to FIG. 2A, there is shown stray light estimator 14 in greater detail. The stray light estimator includes a pixel angle-to-the-sun calculator, designated as 20. The calculator 20 determines which lines of pixels have an angle to the sun that is greater than 6 degrees and which have an angle less than 6 degrees. All lines of pixels having an angle that is greater than 6 degrees from the sun are sent to module 21, and the remaining lines of pixels having an angle that is less than 6 degrees are sent to module 22.

The module 21 corrects the signals for the 3.9 um and 6.5 um radiances for each pixel having an angle greater than 6 degrees from the sun. The corrections are based on subtractions between the received radiance signals and a stored fixed map that includes sets of corrections for every degree (out of 360 degrees). The radiances at 10.7 um and 13.3 um do not require any corrections.

In a similar manner, module 22 corrects the signals for the 6.5 um, 10.7 um and 13.3 um radiances for each pixel having an angle less than 6 degrees from the sun The corrections are also based on subtractions between the received radiance signals and a stored fixed map that includes another set of corrections for every degree. The received signal at the 3.9 um radiance, however, requires more processing in order to reduce the stray light signal. Two additional steps are required, namely, linear spectral interpolation and recursive low pass digital filtering. These two steps are described below.

As shown in FIG. 2A, the originally received signal at 3.9 um radiance and both signals, the corrected 10.7 um and 13.3 um radiances are sent to module 23. The module 23 performs a linear spectral interpolation using the corrected 10.7 um and 13.3 um radiances to estimate a true 3.9 um radiance signal, denoted as R'(3.9). The equation utilized by module 23 to estimate the true 3.9 um signal is as follows:

$$R'(3.9) = a + bR(10.7) + cR(13.3)$$

where
R'(3.9) is the estimated true 3.9 um radiance signal,
R(10.7) is the corrected 10.7 um radiance signal,
R(13.3) is the corrected 13.3 um radiance signal, and
a, b and c are constants.

After the true 3.9 um radiance is estimated, module 23 subtracts the estimated true 3.9 um radiance from the originally received radiance to obtain a noisy 3.9 um stray light signal, as follows:

$$S'(3.9) = R(3.9) - R'(3.9)$$

where
S'(3.9) is the noisy 3.9 um stray light signal,
R(3.9) is the originally received 3.9 um radiance signal, and
R'(3.9) is the estimated true 3.9 um radiance signal.

Module 23 next provides the originally received 3.9 um radiance signal and the noisy 3.9 um stray light signal to module 24. The module 24 includes an 8-pole recursive low pass Bessel digital filter. This Bessel filter is applied to the noisy 3.9 um stray light signal to determine a smooth stray light signal, namely S(3.9). The final corrected 3.9 um radiance signal is determined using the following:

$$C(3.9) = R3.9) - S(3.9)$$

where
C(3.9) is the final corrected 3.9 um radiance signal,
R(3.9) is the originally received 3.9 um radiance signal, and
S(3.9) is the smooth stray light signal at 3.9 um radiance.

The final corrected 3.9 um radiance signal, namely C(3.9), is outputted by module 24. The other corrected radiance signals, namely R(6.5), R(10.7) and R(13.3) are outputted by modules 22 and 23, respectively. These outputted radiance signals are provided to transmitter module 13 (FIG. 1) for transmission back to the GOES satellite, and for final distribution to the end users over the globe.

The above described equations are intended to correct 3.9 μm imager earth data between 3 and 20 degrees from the sun. This enables longer operation of the GOES imagers during eclipse periods.

Figure 2B:
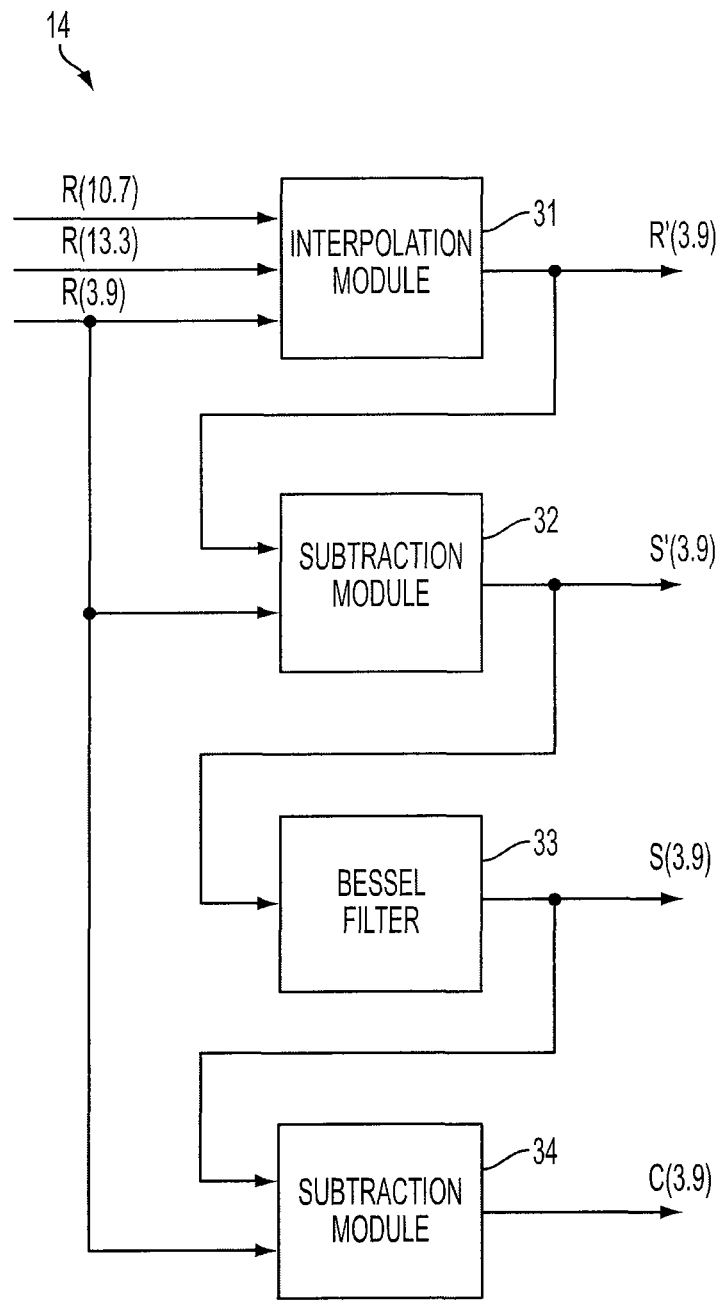
FIG. 2B is a block diagram depicting the stray light estimator shown in FIG. 2A, in accordance with an embodiment of the present invention.

Referring next to FIG. 2B, there is shown a portion of stray light estimator 14, including modules 23 and 24. As shown, an interpolation module 31 receives three different radiances in bandwidth channels of 10.7 um, 13.3 um and 3.9 um. The interpolation module 31 uses linear regression of purely thermal 3.9 μm data against the longer 10.7 μm and 13.3 μm channels to make a true estimate of the underlying 3.9 μm signal, R'(3.9), when significant stray light is present. A subtraction module 32 then subtracts the estimated true 3.9 um signal, R'(3.9), from the original raw 3.9 um signal, R(3.9), thereby forming the 3.9 um noisy stray light signal, S'(3.9). The S'(3.9) signal is then filtered by a Bessel filter, designated as 33 to form a smooth 3.9 um stray light signal, S(3.9). Another subtraction module, designated as 34, subtracts the smooth 3.9 um stray light signal from the original raw 3.9 um signal to form the corrected 3.9 um signal, C(3.9).

Figure 3:
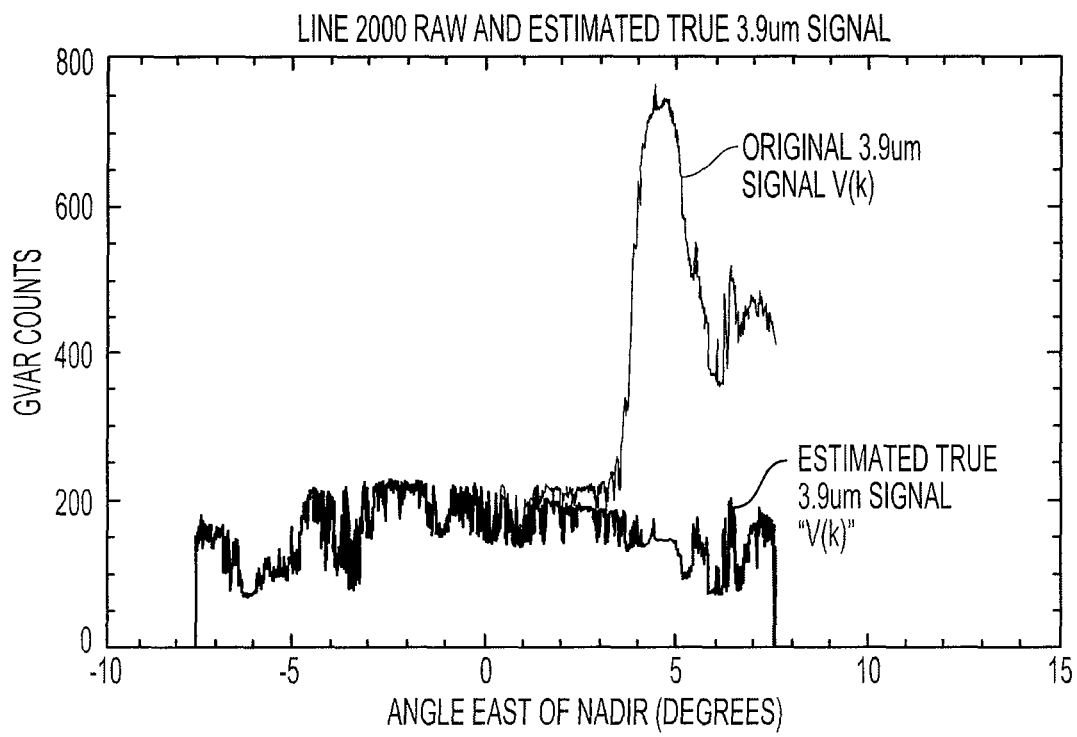
FIG. 3 shows a plot of a raw 3.9 um radiance signal V(k) received by imaging the earth and another plot of an estimated true 3.9 um radiance signal "V(k)", in accordance with an embodiment of the present invention.
Figure 4:
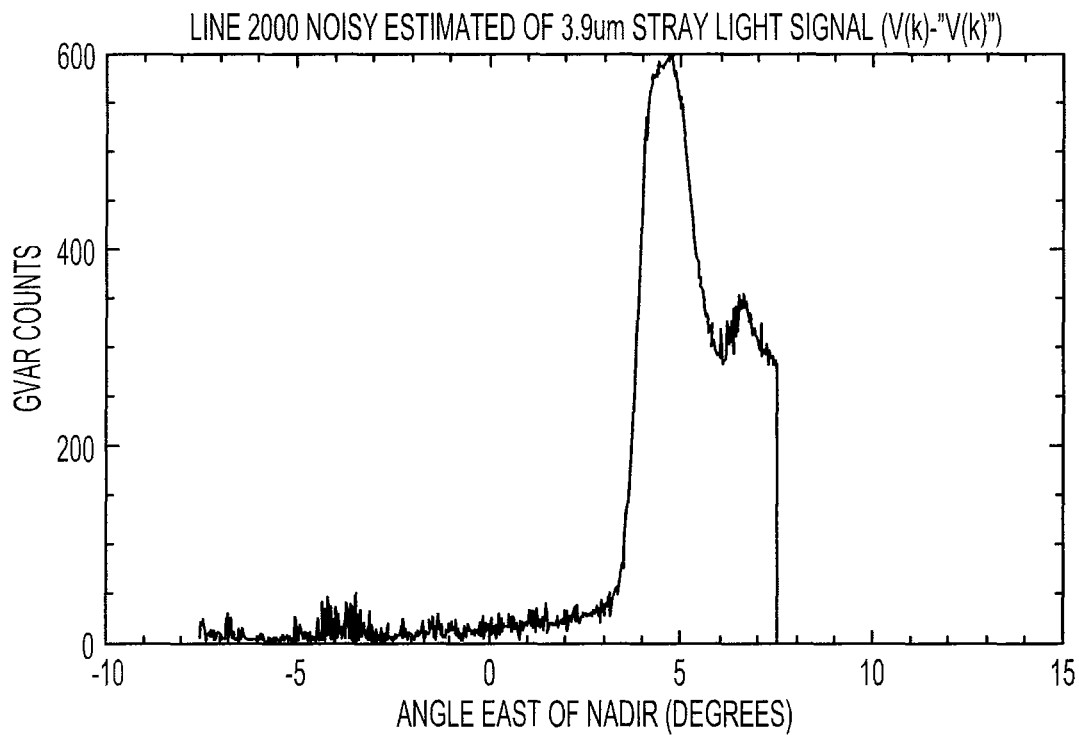
FIG. 4 shows a plot of a noisy estimate of the 3.9 um radiance signal shown in FIG. 3, which is formed by differencing the two plots shown in FIG. 3 [V(k)–"V(k)"], in accordance with an embodiment of the present invention.

The raw 3.9 um signal and the estimated underlying true 3.9 um signal are compared in FIG. 3. The comparison is shown for a single line, or line number 2000 (out of approximately 5000 lines in the imager). The raw signal is denoted as V(k) and the noisy estimated true signal is denoted as "V(k)". When this noisy estimated true signal is subtracted from the originally received, raw 3.9 μm signal, a noisy estimate of the stray light signal is obtained, as shown in FIG. 4.

Figure 5:
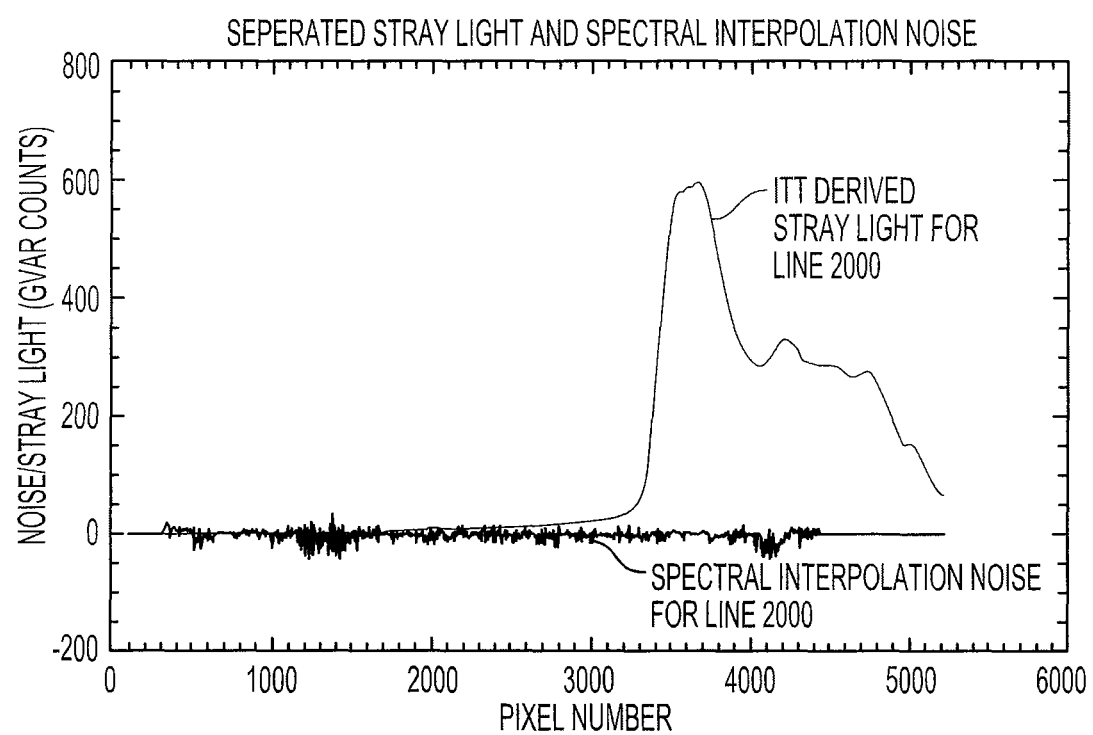
FIG. 5 shows plots of separated stray light, one plot showing derived stray light, S(k), and the other plot showing spectral interpolation noise N(k), formed in accordance with an embodiment of the present invention.
Figure 6:
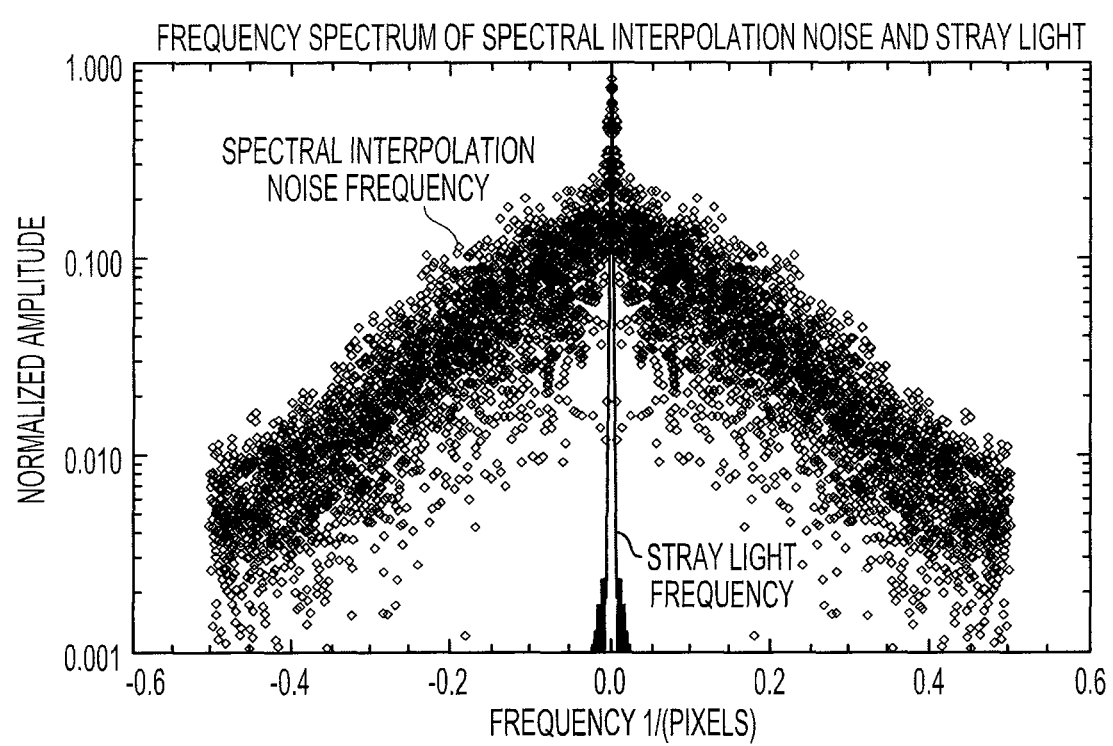
FIG. 6 are spectral plots of the Fourier transforms of the two plots shown in FIG. 5, namely S(k) and N(k), respectively, in accordance with an embodiment of the present invention.

By mapping the GOES satellite stray light using space data, it is possible to separate the true stray light signal, S(k), from the spectral interpolation noise N(k), both shown in FIG. 5. Spectral analysis of these signals in FIG. 6 shows that the true stray light signal, S(k), is of far, lower spatial frequency content than the spectral interpolation noise, N(k). It is, therefore, understood by the present invention that a good estimate of the true stray light signal, S(k), may be obtained by applying an appropriate low pass filter to the composite P(k) shown in FIG. 7. The composite signal may be expressed as follows:

$$P(k) = S(k) + N(k)$$

where

P(k) is the composite signal,

S(k) is the true stray light signal, and

N(k) is the spectral interpolation noise.

Figure 7:
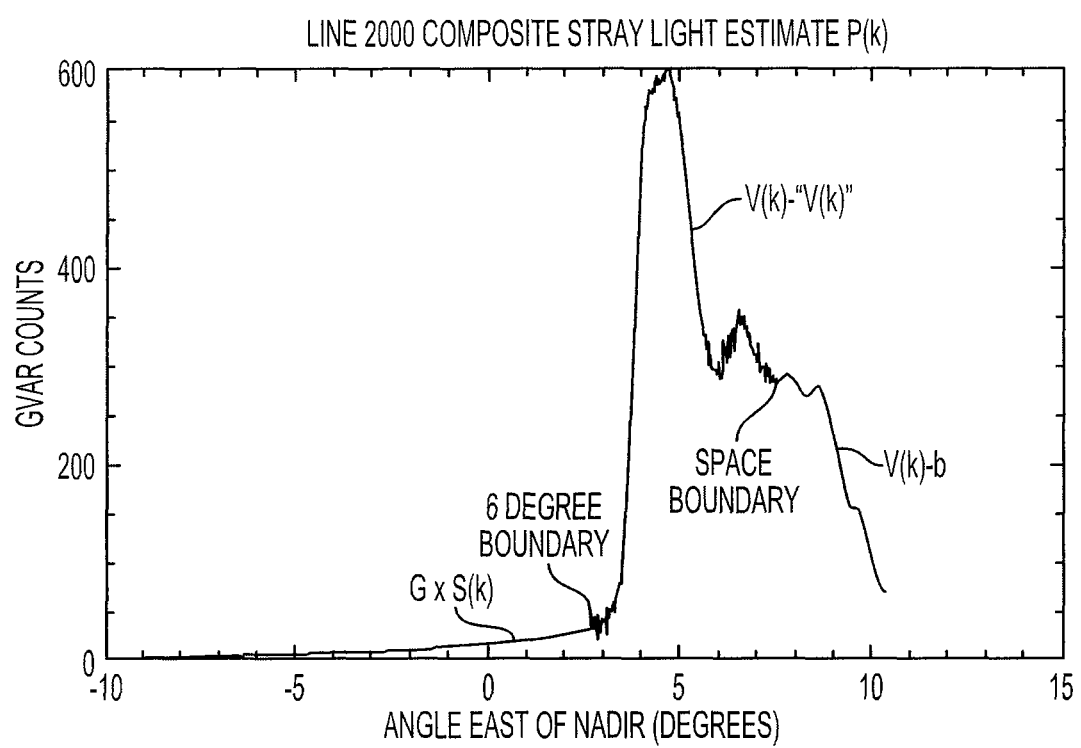
FIG. 7 shows a plot of a composite stray light estimate of the 3.9 um radiance signal denoted as P(k), formed by adding S(k) and N(k), in accordance with an embodiment of the present invention.

Initially, the low pass filtering used a Fourier sum of the coefficients that make up the low frequency structure of the composite shown in FIG. 7. Truncation of the Fourier series at n=63 provides a cut off frequency of 0.024 pixels$^{-1}$ and a good accuracy within the 6° keep out zone down to around 5 GVAR counts. The abrupt truncation in the Fourier domain, however, results in significant Fourier ringing, if a sharp stray light feature is encountered. The inventor, therefore, developed a recursive filter with an infinite frequency response to reduce the ringing effects and improve image quality. This filter developed according to the present invention is a Bessel filter.

The Bessel filter provides the most constant frequency dependent phase delay and amplitude response if a sufficient numbers of poles are included (i.e. a Butterworth filter with frequency dependent phase delay moves coastlines relative to lower spatial frequency regions).

The Bessel filter, H(s), of the present invention is developed within a Laplace domain to low pass filter a Laplace transformed composite signal, P(s), by using multiplication as shown in Eqn. 1. The filter may be found from the reciprocal of a Bessel polynomial of order 'n'. An 8th order filter is shown in Eqns. 2 and 3. Since the Bessel polynomial has 8 complex roots, α1-α8, the filter may be written as the product of eight fractions, as shown in Eqn. 4. It is then possible to covert Eqn. 4 into partial fractions, as shown in Eqn. 5. This form may be inverse Laplace transformed directly back to the spatial domain, as shown in Eqn. 6. In Eqn. 6, ω is the Bessel filter cut-off frequency.

Eqn. 7 rewrites Eqn. 6 into a digital spatial domain for pixel k (where Δx=1 pixel). To create a recursive form of a filter with this spatial response, the present invention uses a unilateral Z transform, as shown in Eqn. 8, in which 'z' is a general complex number with magnitude |z| greater than 1.

Since the Z transform includes 8 infinite geometric series with common factors $e^{\alpha i\omega\Delta x}z^{-1}$, the Z domain impulse response of the Bessel filter may be written as shown in Eqn. 9.

Similar to the Laplace domain, the filtered result, S(z), may be found in the Z domain from the product of the signal P(z) and the filter impulse response H(z), as shown in Eqn. 10. Expansion of Eqn. 9, which represents H(z), shows that it is a ratio between a 7th and an 8th order polynomial of z, the latter shown in Eqn. 11.

Equations 1 to 11 are shown below.

$$S(s) = H(s) \times P(s) \quad (1)$$

$$H(s) = 2027025 \times \left[\sum_{i=0}^{8} \frac{(8+i)!}{(8-i)!i!} \times \left(\frac{s}{2}\right)^i\right]^{-1} \quad (2)$$

$$= \frac{2027025}{2027025 s^8 + 2027025 s^7 + 9459455 s^6 + 2702705 s^5 + 519755 s^4 + 6930 s^3 + 630 s^2 + 36 s + 1} \quad (3)$$

$$= \prod_{i=1}^{8} \frac{1}{s - \alpha_i} \quad (4)$$

$$= \sum_{i=1}^{8} \frac{\alpha_i}{s - \alpha_i} \quad (5)$$

$$H(x) = \sum_{i=1}^{8} \alpha_i e^{\alpha_i \omega x} \quad (6)$$

$$H_k = \sum_{i=1}^{8} \alpha_i e^{\alpha_i \omega k \Delta x} \quad (7)$$

$$H(z) = \sum_{k=0}^{\infty} H_k \times z^{-k} \quad (8)$$

$$= \sum_{i=1}^{8} \frac{a_i}{1 - e^{\alpha_i \omega \Delta x} z^{-1}} \quad (9)$$

$$S(z) = H(z) \times P(z) \quad (10)$$

$$= \begin{pmatrix} c_0 - c_1 z^{-1} + c_2 z^{-2} - c_3 z^{-3} + \\ c_4 z^{-4} - c_5 z^{-5} + c_6 z^{-6} - c_7 z^{-7} \\ c_8 z^{-1} - c_9 z^{-2} + c_{10} z^{-3} - c_{11} z^{-4} + \\ c_{12} z^{-5} - c_{13} z^{-6} + c_{14} z^{-7} - c_{15} z^{-8} \end{pmatrix} \times P(z) \quad (11)$$

The present invention takes advantage of Eqn. 12, which shows a property of the Z transform, and rearranges Eqn. 11, before performing an inverse Z transform to return to the digital space domain, which provides the recursive relationship shown in Eqn. 13. Both equations are shown below, as follows:

$$F(z) \times z^{-P} = \sum_{k=0}^{\infty} F_{k-p} \times z^{-k} \quad (12)$$

$$S_k = c_0 P_k - c_1 P_{k-1} + c_2 P_{k-2} - c_3 P_{k-3} + \\ c_4 P_{k-4} - c_5 P_{k-5} + c_6 P_{k-6} - c_7 P_{k-7} + \\ c_8 S_{k-1} - c_9 S_{k-2} + c_{10} S_{k-3} - c_{11} S_{k-4} + \\ c_{12} S_{k-5} - c_{13} S_{k-6} + c_{14} S_{k-7} - c_{15} S_{k-8} \quad (13)$$

The recursive filter shown in Eqn. 13 may be applied in real-time on a line-by-line basis to the composite signal P(k) to derive the underlying smooth stray light signal Sk, after the Bessel filter delay is determined.

Figure 8:
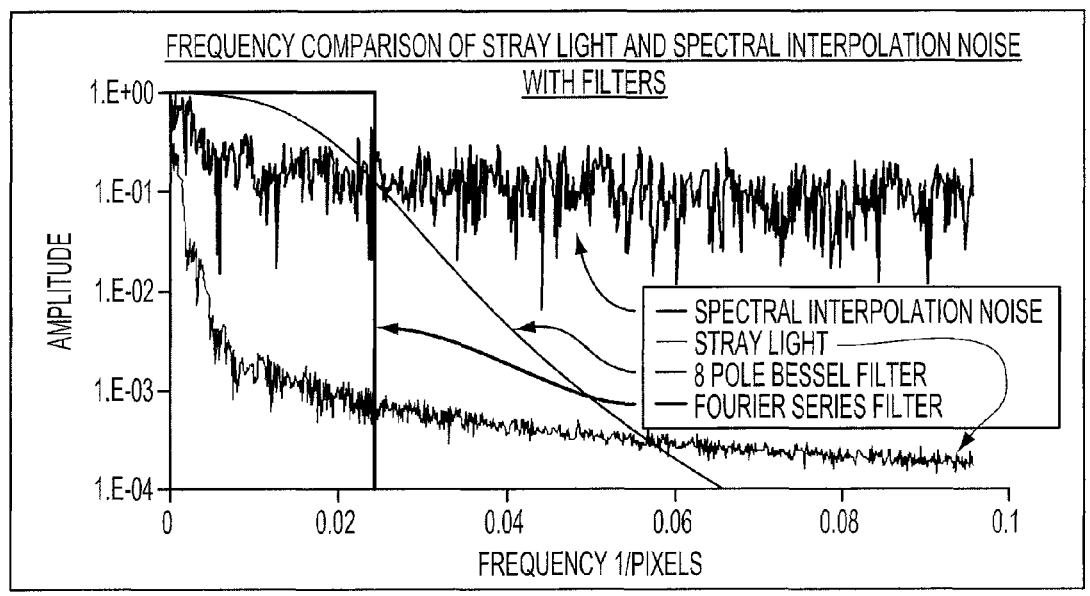
FIG. 8 shows the filter frequency response of a Bessel filter compared to a Fourier series filter, when used for filtering the spectral interpolation noise and the stray light, in accordance with an embodiment of the present invention.

An optimum cut off frequency may be determined using a gradient descent algorithm that maximizes the retrieved data accuracy. FIG. 8 shows the amplitude frequency response of both a Fourier series filter (ω=2n*0.024 pixels$^{-1}$) and an 8-pole Bessel filter (ω=2n*0.021 pixels$^{-1}$). A comparison is also shown between the stray light signal and the spectral interpolation noise.

The inventor discovered that the Fourier series and the Bessel filter are nearly identical in RMS accuracy. The step function shape of the Fourier series filter (shown in FIG. 8), however, results in Fourier "ringing" when a sharp stray light feature is encountered. The infinite frequency response of the Bessel filter, on the other hand, prevents the "ringing". Accordingly, the Bessel filter with the 8-poles is advantageous over the Fourier series filter.

Figure 9:
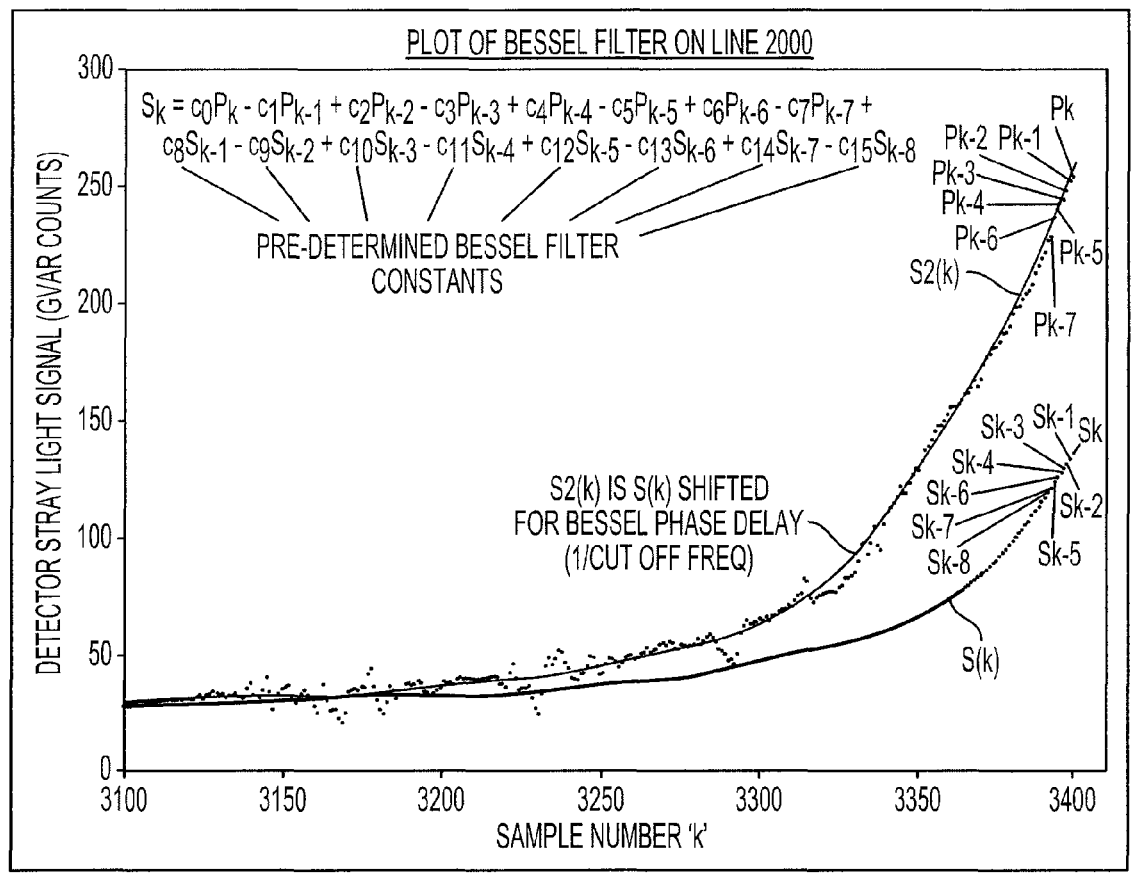
FIG. 9 is a plot of the iterative process used in finding the stray light signal in line 2000 of an image by way of an 8-pole Bessel filter, in accordance with an embodiment of the present invention.
Figure 10:
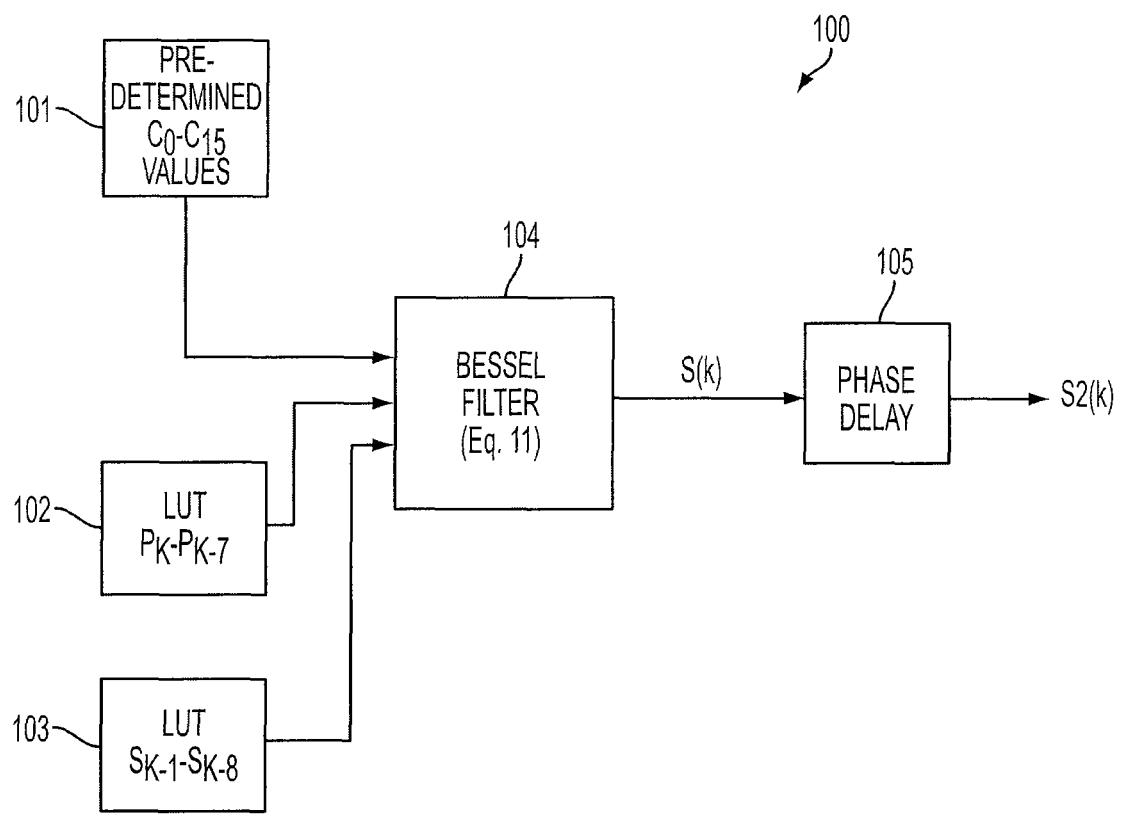
FIG. 10 is a block diagram of an exemplary 8-pole Bessel filter, in accordance with an embodiment of the present invention.

Referring next to FIGS. 9 and 10, there is shown an example of an 8-pole Bessel filter, designated as 100, used in finding the stray light signal S(k) detected by an imager in the GOES satellite 11 of FIG. 1. It will be appreciated that while FIGS. 9 and 10 depict an 8-pole Bessel filter finding the stray light signal detected by the GOES imager, the present invention is not limited to an 8-pole filter, nor to the GOES imager. Instead, the present invention may include any order Bessel filter used as a low pass filter for any intensity data detected by any imager.

The plot of S(k) shown in FIG. 9 uses data from various samples 'k' detected in line 2000 of the GOES imager. In order to find the present stray light at sample 'k', the previous stray light detected by the imager in the previous 8 samples of 'k' are used in system 100. These values are known and may be extracted from a look-up-table (LUT), designated as 103 in FIG. 10. Thus, the previous 8 stray light values, namely $S_{k-1}$ through $S_{k-8}$ are taken from LUT 103. In a similar manner, the 8 successive values of the composite signal, namely $P_k$ through $P_{k-7}$, are taken from LUT 102. Providing the predetermined values of $C_0$ through $C_{15}$ from module 101 to the Bessel filter, designated as 104, the present value of the stray light S(k) may be determined using Equation 11.

The value of S(k) is next corrected for the phase delay by using module 105 to shift the signal S(k) by an amount dependent on the inverse of the cut off frequency, as described above. In this manner, the corrected stay light signal is determined as shown in FIG. 9 by shifting S(k) to the plot indicated as S2(k). It will be appreciated that the corrected 3.9 um radiance, C(3.9) is the same as the signal S2(k) shown in FIG. 10.

What is claimed:

1. A system for correcting infrared (IR) radiances comprising:
   an imager for receiving IR radiances and outputting intensity data corresponding to pixels in the imager, and
   a stray light estimator for receiving the intensity data and estimating stray light in the intensity data,
   wherein the stray light estimator includes a Bessel filter for low pass filtering the estimated stray light and a module for providing corrected intensity data as an output to a user, and
   the stray light estimator includes an interpolator for receiving multiple bandwidths of the intensity data and interpolating the multiple bandwidths to obtain the estimated stray light in a first bandwidth, and
   the Bessel filter is configured to receive the estimated stray light and provide filtered intensity data in the first bandwidth, as an output to the user.

2. The system of claim 1 wherein
   the Bessel filter is comprised of a ratio between (a) an (n−1) order polynomial of a complex number and (b) an n order polynomial of a complex number,
   where n is a positive integer.

3. The system of claim 1 wherein
   the Bessel filter is an n-pole recursive digital filter, where n is a positive integer.

4. The system of claim 3 wherein
   n is the number 8.

5. The system of claim 3 wherein
   the Bessel filter includes an infinite response curve, and
   the response curve monotonically decreases in amplitude as a function of frequency per pixels.

6. The system of claim 1 wherein
   the Bessel filter includes a subtraction module for subtracting the estimated stray light from the intensity data and outputting the corrected intensity data in the first bandwidth.

7. The system of claim 1 wherein
   the multiple bandwidths include 3.9 um and other bandwidths, and
   the first bandwidth is the 3.9 um bandwidth.

8. The system of claim 1 wherein
   the imager includes an imager disposed in a satellite,
   the IR radiances include radiances reflected from the Earth, and
   the Bessel filter is configured to low pass filter a portion of the IR radiances.

9. A filtering system comprising:
   a module for outputting pixel data, and
   a Bessel filter for low pass filtering the pixel data,
   wherein the Bessel filter has an impulse response, H(z), where H(z) is a ratio of polynomials, and z is a variable.

10. The system of claim 9 wherein
    the Bessel filter is an n-pole recursive digital filter, where n is a positive integer.

11. The system of claim 10 wherein
    n is the number 8.

12. The system of claim 9 wherein
    the Bessel filter is comprised of a ratio between (a) an (n−1) order polynomial of a complex number and (b) an n order polynomial of a complex number,
    where n is a positive integer.

13. The system of claim 9 wherein
    the Bessel filter includes an infinite response curve, and
    the response curve monotonically decreases in amplitude as a function of frequency per pixels.

14. The system of claim 9 wherein
    the pixel data includes signals in the infrared (IR) region.

15. A method of filtering image data in the infrared region (IR) comprising the steps of:
    receiving IR radiances and outputting intensity data;
    estimating noisy stray light in the intensity data;
    filtering the estimated noisy stray light to obtain smooth stray light;
    subtracting the smooth stray light from the received IR radiances;
    outputting corrected IR radiances to a user, after the subtracting step.

16. The method of claim 15 wherein
    filtering includes using a Bessel filter to low pass filter the estimated noisy stray light.

17. The method of claim 16 wherein
    using the Bessel filter includes forming an n-pole recursive digital filter, wherein n is an integer number.

18. The method of claim 16 wherein
    using the Bessel filter includes forming a ratio between (a) an (n−1) order polynomial of a complex number and (b) an n order polynomial of a complex number, where n is an integer number.

19. The method of claim 15 wherein
    receiving the IR radiances includes receiving multiple radiances having different bandwidths;
    estimating the noisy stray light includes interpolating the received multiple radiances to form the noisy stray light in a single bandwidth; and
    filtering the estimated noisy stray light includes using a Bessel filter to low pass filter the noisy stray light in the single bandwidth to form the smooth stray light.

* * * * *